United States Patent Office 3,172,737
Patented Mar. 9, 1965

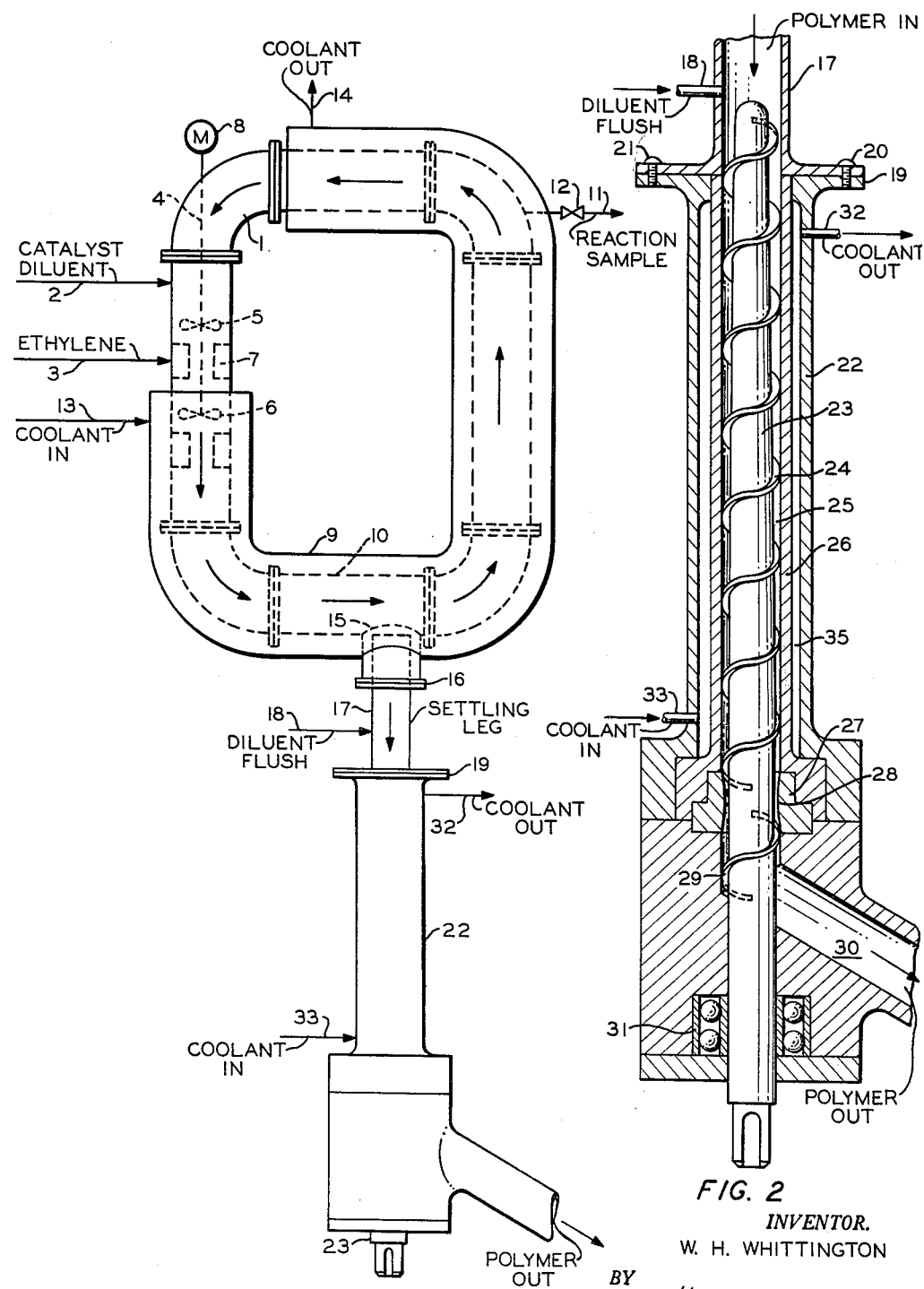

3,172,737
APPARATUS FOR THE REMOVAL OF SOLIDS
FROM PRESSURE VESSELS
William H. Whittington, Bartlesville, Okla., assignor to
Phillips Petroleum Company, a corporation of Delaware
Filed July 6, 1961, Ser. No. 122,283
3 Claims. (Cl. 23—285)

This invention relates to the recovery of solids from pressure vessels. In one aspect the invention relates to the recovery of solid olefin polymers from hydrocarbon slurries thereof. In another aspect the invention relates to the recovery of particulate olefin polymers from continuous path reactors containing polymer slurries under pressure.

The removal of solids from a pressure vessel is frequently a difficult problem since the removal of the solids usually requires the removal of a portion of the carrying fluid as well as a decrease in pressure. This problem is particularly aggravated when the solids to be removed comprise a reaction product and substantial loss of pressure or diluent would affect the chemical reaction. One example of such a reaction process is the polymerization of ethylene and mixtures of ethylene with other unsaturated hydrocarbons to produce a solid particle form polymer which must then be continuously removed from the reaction zone with a minimum loss of diluent or reaction zone pressure. One method of carrying out the particle form polymerization of ethylene is described in the copending application of Donald D. Norwood, Serial No. 819,391, filed June 10, 1959, now abandoned. In this copending application a method and apparatus is described for reducing the fouling of reaction surfaces by carrying out the polymerization reaction in a tubular closed loop reaction zone with smooth surfaces. The catalyst, liquid diluent and hydrocarbon reactants are continuously moved through the reaction zone at a velocity sufficient to prevent polymer deposition and in the highly turbulent flow range thereby producing a solid particle form product which is then withdrawn from the reaction zone.

This invention represents an improvement over the aforementioned copending application of Norwood by providing an improved method for the removal of solid polymer product from a continuous path reactor.

Several methods have been proposed for the removal of solids from pressure vessels but these methods usually require the use of a valve periodically actuated so as to minimize the loss of diluent and pressure. These proposed apparatus are frequently disadvantageous because the high frequency of valve operation tends to shorten the valve life and increase the maintenance cost, intermittent flow of product upsets the process variables in downstream equipment and requires equipment larger than otherwise necessary to compensate the surges, and withdrawal of slurry at reactor concentration requires large diluent purification facilities with several parts of diluent being circulated for each part of polymer produced. In addition, in the production of thermoplastic materials, such as polyethylene, it is frequently difficult to prevent polymer agglomeration on valves and the like.

It is an object of this invention to provide an improved apparatus for recovering solids from a pressure vessel.

It is another object of this invention to provide an improved apparatus for recovering high molecular weight, solid particulate form olefin polymers from a hydrocarbon slurry thereof.

It is another object of this invention to provide an improved apparatus for recovering solid particulate form polymers from a hydrocarbon slurry thereof contained in a continuous path loop reactor.

Yet another object of this invention is to provide an improved apparatus for recovering high molecular weight, solid particulate form polymers from a hydrocarbon slurry thereof contained in a continuous path loop reactor operated under superatmospheric pressure.

These and other objects of the invention will become more readily apparent from the following detailed description, discussion and claims.

The foregoing objects are broadly accomplished in apparatus comprising in combination: a tubular closed loop reactor means for introducing reactants into said reactor, means for continuously propelling the contents through said reactor, the thus produced product solids being permitted to enter an appendage thereby collecting a fraction concentrated in particulate solid product, by the improvement comprising an assemblage attached to a lower portion of said appendage, said assemblage comprising a housing in open communication with the interior of the lower portion of said appendage, a solid conveying means axially positioned within said housing and extending into the lower portion of said appendage, the annular clearance between said conveying means and the interior of said housing gradually decreasing toward the discharge terminus of said housing, the shaft of said conveying means having a flightless choke section of reduced cross-sectional area near said discharge terminus, a removal section of said conveying means having increased cross-sectional area for removing solids from said choke section, means for rotating said conveying means and means for withdrawing solids from said removal section.

The apparatus of this invention is broadly applicable to any process and apparatus requiring the continuous discharge of solids from a slurry thereof from a vessel operated under pressure with a minimum loss of diluent and/or pressure from said vessel.

For purposes of simplification the invention will be described with reference to process and apparatus utilized in the polymerization of ethylene and mixtures of ethylene with other unsaturated hydrocarbons to produce particle form polymers in a continuous path loop reactor such as described in the copending application of Norwood, supra. It is to be understood that the apparatus of this invention is applicable to many types of reactors.

It is disclosed in Hogan et al., U.S. Patent 2,825,721, that polymers and copolymers can be produced by contacting one or more olefins with a catalyst comprising as an essential ingredient chromium oxide, preferably including a substantial amount of hexavalent chromium. The chromium oxide is associated with at least one other oxide particularly selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide containing catalyst. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of ethylene which are insoluble in the hydrocarbon diluent. This polymer is formed in association with the polymerization catalyst and is suspended in the liquid diluent in solid particle form. The preparation of insoluble particle form polymer is disclosed in the copending application of Leatherman et al., Serial No. 590,567, filed June 11, 1956, now abandoned. In the following discussion the term "particle form polymer" will be employed to designate the insoluble polymers of ethylene formed in accordance with the Leatherman et al. application.

Particle form polymer can be prepared from ethylene and from mixtures of ethylene with other unsaturated hydrocarbons, for example, mixtures of ethylene with minor amounts of higher 1-olefins, such as propylene, 1-butene, 1-pentene, 1-hexene, and the like. Examples of comonomers which can be used with ethylene include 1-olefins having no branching nearer the double bond than the 4-position and conjugated and non-conjugated diolefinis. The polymerization reaction is carried out in the presence of a liquid hydrocarbon diluent which is inert in the polymerization reaction and in which the majority of the polymer is insoluble under reaction conditions. Suitable diluents include paraffins such as those having from 3 to 12 and preferably 3 to 8 carbon atoms per molecule, for example, n-butane, n-pentane, isopentane, n-hexane, n-decane etc., saturated cyclic hydrocarbons such as cyclohexane, cyclopentane and methylcyclopentane, methylcyclohexane, etc. The polymerization reaction temperature will vary depending on the particular liquid diluent which is employed and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.001 to 5 percent by weight based on the liquid hydrocarbon diluent. For a more detailed description of the polymerization process including reaction conditions, catalyst, etc., reference can be had to the copending application of Leatherman et al., Serial No. 590,567, filed June 11, 1956.

By the method and apparatus of this invention the polymer product may be continuously recovered from the loop reactor with a minimum of accompanying liquid diluent and hydrocarbon reactants. This minimizes the need for the recycling of olefin and the recycling of diluent from the product recovery zone to the reaction zone.

By the method and apparatus described in the copending application of J. S. Scoggin, Serial No. 19,007, filed March 31, 1960, an appendage is attached to the loop reactor in such a manner that the flowing reactants and diluent continuously pass the entrance to said appendage thereby permitting the heavier particles to continuously enter the appendage by gravitational or centrifugal forces. The lighter diluent and reactants continue to flow across the entrance thereby resulting in the collection within said appendage of a fraction concentrated in particulate polymer solids. This invention represents an improvement over said copending application. Any type of appendage is employable so long as the entrance thereto is large enough to prevent bridging of the polymer and yet not so large as to result in an unduly large amount of diluent and reactants being entrapped in said appendage. The polymer production rate is a function of the settling area, i.e., the diameter of the entrance to the appendage. Further, the required length of the appendage is also a function of the velocity as well as the inventory of the polymer within said appendage. For instance, when using a 10-inch I.D. reactor, a 1¼" diameter appendage, and a reactor velocity of approximately 8 feet per second, the turbulent zone extends approximately 5½ diameters into said appendage so the length must extend past this point to provide a zone of relatively quiet. When the polymer solids concentration is 20 to 25 percent within the reactor and the linear velocity is 10 to 14 feet per second, the polymer builds up within said zone at an approximate rate of 1 to 2 feet per minute. As illustrated by the attached drawing, the appendage may consist of a simple tube appended to the bottom portion of a horizontal leg of the reaction zone. Preferably, the length of the zone will be at least 3 times the diameter of the appendage, more preferably 4 to 40 times. In general, it is more advantageous to have a multiple number of small diameter zones rather than a single large diameter unit in order to improve the flexibility of control of production rate.

The invention is best described by reference to the accompanying drawing.

FIGURE 1 is a diagrammatic representation of the apparatus of the invention employed in conjunction with a loop reactor and settling leg of the type hereinbefore described.

FIGURE 2 is a cross section of the polymer removal apparatus of the invention.

Reactor 1, which is oblong in shape, is made of flanged straight pipe sections and L's joined together to provide a continuous flow path which is substantially free from obstructions. The reactor is jacketed by section 9 which forms an annular space 10 with the reactor 1. By means of inlet 13 and outlet 14 a heat exchange fluid is permitted to flow through annular space 10 to control the temperature of the reactor. Conduit 2 is provided for the introduction of catalyst and diluent into the reactor and conduit 3 is provided for the introduction of ethylene into the reactor. Conduit 11 and valve 12 are provided for the periodic removal of a reaction sample to ascertain the conditions within the reactor. Thermocouples can be provided for sensing the temperature in the reactor. Provision can be made to transmit the measurement of the reactor temperature to a temperature recorder controller (not shown) which can be utilized to control the reactor temperature. Various control methods can be used including control of the heat exchange fluid to jacket 9, control of the quantity and/or temperature of reactants entering the reactor, control of the amount of catalyst entering the reactor, etc. Vertically disposed drive shaft 4 connects to propellers 5 and 6. Suitable means can be provided outside the reactor, such as variable speed motor 8, for actuating the drive shaft 4 and propellers 5 and 6. Although the propelling means are shown in a vertical leg, it is sometimes desirable to place the propelling means in a horizontal leg since this is the area most susceptible to polymer build-up. Axial flow and rotational swirl are produced by propellers 5 and 6 and the rotational swirl is converted in part to axial flow by providing straightening vanes 7, formed by metal plates projecting perpendicularly from the inner wall of the reactor and positioned in the area of propellers 5 and 6. Any suitable means may be used to convert rotational energy to flow energy.

In the apparatus shown the vertical leg in which the propellers are positioned has substantially the same cross sectional area as the remainder of the reactor; however, if desired, the vertical leg may have a larger or smaller diameter. The various parts which make up the reactor are constructed to provide a smooth, continuous, inner surface presenting a minimum of obstruction to flow. The only obstruction of any consequence in the reactor are the propellers 5 and 6 and straightening vanes 7. The reactor may be made up of flanged sections or partially or completely welded.

The settling leg, appendage or receiving zone 17 may consist of a pipe welded directly onto the reactor outside wall and extending through the heat exchange jacket thereby establishing open communication with the reactor at 15. This section terminates in a flange 16 through which the appendage 17 protrudes from the reactor to some distance below the reactor thereby forming a receiving chamber for particles gravitating from the reactor. In the case of a 95-gallon reactor having a 10-inch internal diameter, this receiving zone can be a 1¼ inch I.D. pipe 43 inches in length welded to said reactor. The size of the opening, the position thereof, the size of the pipe, and the capacity of the appendage or settling leg is variable within considerable limits to fit the conditions of operation.

Attached to the lower terminus of said appendage is the assemblage of this invention. Conveniently, the assemblage is attached to the settling leg by any suitable means, such as flange 19 through bolts 20 and 21 (cf. FIG. 2). Housing 22 is suspended from the settling leg in an upright position although it is also permissable for the asemblage to be at right angles to the longitudinal axis of the settling leg or at any other convenient angle. Preferably, the shaft 23 of worm 24 extends into the lower portion of the settling leg so as to assist in the removal of the settled particulate solids from the settling leg into the annular clearance 25 defined by shaft 23 and worm housing 26. It is to be noted that shaft 23 of the auger is tapered so as to provide a gradually decreasing annular clearance between the auger shaft and the interior boundaries of the chamber 26.

The polymer slurry enters settling leg 17 at a concentration in the range of 18 to 25 percent. By the use of a diluent flush through conduit 18 and the resultant elutriation of diluent, small particles, and reactants back into the reactor, the particulate solid polymers gravitate toward the bottom of the lower portion so that a concentration in the range of approximately 55 percent is achieved. By means of applicant's apparatus further concentration to approximately 100 percent solids is achieved without loss of diluent or pressure and without the necessity for further handling. The worm 24 conveys the polymer solids and diluent toward the lower terminus of annular area 25. Since this area is gradually decreasing, more and more of the diluent is pressed out of the solids so that the polymer concentration increases toward the lower terminus of the housing. Since this compression requires the introduction of considerable amounts of mechanical energy which is translatable into thermal energy, it is preferred that means be provided for cooling the auger, e.g., by an internally cooled auger or a heat exchange jacket, so that a minimum amount of polymer agglomeration occurs and substantially all of the diluent may be removed from the polymer. This is conveniently achieved by passing a coolant from conduit 33 through annular space 35 surrounding chamber 26 and out through conduit 32. Near the lower terminus of the housing a choke sleeve 27 is provided which flares in toward the shaft of the auger so as to drastically reduce the cross-sectional area available for passage of the polymer. This reduced cross-sectional area 28 serves two functions: (1) The reduction in area further compresses the polymer so as to squeeze out more diluent which is continually forced back into the settling leg through the tortuous path provided through the auger, and (2) since this choke area contains a section of the auger shaft devoid of a conveying means, e.g. a worm, a dynamic plug or densified stream of polymer can be maintained therein. This is most important during periods of no polymer production. For example, if for some reason, no polymer gravitates into the settling leg, the plug of polymer prevents the loss of diluent and pressure from the reactor. Immediately downstream of the choke area the auger again contains flights 29 for the removal of polymer leaving the choke area. This polymer proceeds through passageway 30 to be further processed, such as further drying by a flash dryer (not shown). Shaft 23 is supported at its lower terminus by any suitable means such as bearings 31 and the auger is driven by any suitable means (not shown). For example, the auger is preferably driven by a variable speed motor so that the peripheral speed of the auger can be varied to fit the particular conditions required, thus providing a means for adjusting polymer withdrawal rate.

It is generally preferred to provide rifling or longitudinal grooves in the interior walls of valve housing 26 to prevent the rotation of solid particulate polymer within the annular area 25.

Although the annular clearance has been shown in the drawing to be decreased by the use of a tapered auger it is also possible to provide other means for varying the compression of polymer, such as by tapering the housing 26 or by varying the pitch of worms 24 so as to increase the compression of the polymer at the lower terminus or downstream terminus.

In a specific embodiment utilizing the apparatus illustrated in the drawing, high density polyethylene in particulate solid form was produced in the presence of pentane at a temperature of 190° F. and a pressure of 450 p.s.i. The average size of the particulate solids were from 0.007 to 0.36 inch in diameter as measured by passage through screens with the largest percentage of the particles being in the 0.033 inch range. The bulk density of the polymer was approximately 20 lbs. per cubic feet compared to approximately 60 lbs. per cubic feet for the solid polyethylene.

The auger barrel was 1¼ inches in diameter by 15½ inches long with eight 0.032 inch deep by 0.250 inch wide grooves runing parallel to the barrel center line. The outlet end of the barrel had a smooth bore choke sleeve having 1.110 inch I.D. The barrel had a cooling jacket around the outlet end with coolant being provided at approximately 70° F. The auger screw protruded past the barrel inlet as illustrated in the drawing. The auger screw had 18½ linear inches of flights with the flights being interrupted for 1⅛ inches through the choke. The O.D. of the screw flights had a 0° 30″ tapered 8 inches from the feed end. The annular area between the screw and the barrel wall had a 3:1 ratio to the choke sleeve with the over-all decrease in this annular area through the choke at 4:1. The screw had approximately 2½ inches of flights preceding the choke area in which the land depth was a constant 0.063 inch. This constant land depth was to provide positive feed to the choke. The remaining screw flights assist in the removal of material from the choke area. Tests with an over-all compaction ratio of 4:1 indicate that polymer is extrudable at the rate of 20 lbs. per hour from a 600 p.s.i.g. gas pressure vessel without the loss of diluent or pressure. Preferably, the compression ratio between the choke sleeve and the remainder of the annular clearance is in the neighborhood of 1⅓ to 1. It is most important that the concentricity of the annular area in the choke sleeve be true.

While certain examples, structures, composition and process steps have been described for purposes of illustration, the invention is not limited to these. Variation and modification within the scope of the disclosure and the claims can readily be effected by those skilled in the art.

I claim:

1. Apparatus comprising, in combination: a tubular closed reactor with smooth bends, said reactor being substantially free from internal obstructions; means for introducing olefin reactant, polymerization catalyst, and liquid hydrocarbon diluent into said reactor; means for continuously moving the contents of said reactor therethrough; an upright appendage attached to and in direct open communication with the interior of the lower portion of said reactor disposed to receive solids from said reactor; means for cooling the interior of said appendage; a housing in direct open communication with the interior of the lower portion of said appendage; a tapered shaft with worm positioned within said housing and extending into the lower portion of said appendage, the annular clearance between said shaft and the interior wall of said housing gradually decreasing toward the discharge terminus of said housing; said housing having a choke section of reduced cross-sectional area near said lower terminus, said choke section being free of worm on said tapered shaft; a removal worm section on a continuation of said shaft having increased clearance between said shaft and said interior housing wall downstream of said choke section for removing solids from said choke section; means for rotating said conveying means; means for withdrawing solids from said removal section.

2. The apparatus of claim 1 wherein the interior cross-sectional area of said housing is decreased.

3. In apparatus comprising a tubular closed loop reactor with smooth bends, said reactor being substantially free from internal obstructions; means for introducing olefin reactant, polymerization catalyst, and liquid hydrocarbon diluent into said reactor; means for continuously moving the contents of said reactor therethrough; an upright appendage attached to and in direct open communication with the interior of said reactor so as to receive solids from said reactor and thereby concentrating said solids in the lower portion thereof; and means for introducing diluent into the interior of said appendage to cool said solids; the improvement comprising, in combination: an upright positioned assemblage attached to the lower terminus of said appendage comprising a housing in direct open communication with the interior of a lower portion of said appendage; a tapered shaft with worm positioned within said housing and extended into the lower portion of said appendage, the annular clearance between said shaft and the interior of said housing gradually decreasing toward the lower terminus of said housing; means for cooling said annular clearance, means for rotating said worm; a choke section of reduced cross-sectional area near said lower terminus, said shaft being flightless in said choke section; a removal worm section on a continuation of said shaft having increased clearance between said shaft and said interior housing wall for removing solids from said choke section; means for withdrawing solids from said removal worm section.

References Cited in the file of this patent

UNITED STATES PATENTS

| | | |
|---|---|---|
| 2,156,236 | Bonatto | Apr. 25, 1939 |
| 2,321,015 | Davis | June 8, 1943 |
| 2,376,833 | Teter | May 22, 1945 |